(12) United States Patent
Tu et al.

(10) Patent No.: US 8,467,404 B2
(45) Date of Patent: Jun. 18, 2013

(54) ENHANCED CHANNEL DETECTION

(75) Inventors: Alex Kuang-Hsuan Tu, San Diego, CA (US); Parag Kanade, San Diego, CA (US); Virat Deepak, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 645 days.

(21) Appl. No.: 12/415,300

(22) Filed: Mar. 31, 2009

(65) Prior Publication Data

US 2010/0246420 A1    Sep. 30, 2010

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl.
USPC ........... 370/430; 370/252; 370/329; 370/342; 455/552

(58) Field of Classification Search
USPC ............... 370/225–253, 311–329, 352–430; 455/552–574, 431–456
See application file for complete search history.

(56) References Cited

U.S. PATENT DOCUMENTS

| | | | |
|---|---|---|---|
| 5,867,766 A * | 2/1999 | Dinc et al. ...................... | 455/62 |
| 6,320,896 B1 | 11/2001 | Jovanovich et al. | |
| 7,013,140 B2 * | 3/2006 | Ostberg et al. ................ | 455/434 |
| 7,096,016 B2 * | 8/2006 | Hasegawa ...................... | 455/434 |
| 7,403,539 B1 * | 7/2008 | Tang et al. ..................... | 370/445 |
| 7,720,440 B2 * | 5/2010 | Zhu et al. ...................... | 455/63.1 |
| 2004/0132410 A1 | 7/2004 | Hundal et al. | |
| 2007/0189259 A1 * | 8/2007 | Sollenberger et al. ........ | 370/342 |
| 2008/0220778 A1 | 9/2008 | Ekstedt et al. | |
| 2009/0137267 A1 * | 5/2009 | Nader et al. ................ | 455/552.1 |
| 2009/0268830 A1 * | 10/2009 | Birru et al. ..................... | 375/260 |
| 2010/0091715 A1 * | 4/2010 | Akchurin et al. ............. | 370/329 |
| 2010/0118695 A1 * | 5/2010 | Shellhammer et al. ....... | 370/225 |
| 2010/0165861 A1 * | 7/2010 | Rrdland et al. ............... | 370/252 |

OTHER PUBLICATIONS

International Search Report and Written Opinion PCT/US2010/028812, International Search Authority—European Patent Office—Sep. 20, 2010.

* cited by examiner

*Primary Examiner* — M. Phan
(74) *Attorney, Agent, or Firm* — S. Hossain Beladi

(57) ABSTRACT

An apparatus for detecting the presence of a frequency channel is provided. The apparatus comprises an energy detection unit configured to measure receive energy over a first bandwidth and a second energy detection unit configured to measure receive energy over a second bandwidth. The apparatus further comprises a processor configured to compare the measured receive energy over the first bandwidth to a first energy threshold, to compare the measured receive energy over the second bandwidth to a second energy threshold, and to detect the presence of the frequency channel when the measured receive energies over the first and second bandwidths are above the first and second energy thresholds, respectively.

47 Claims, 8 Drawing Sheets

ENHANCED CHANNEL DETECTION

BACKGROUND

1. Field

The subject technology generally relates to wireless communication systems, and more specifically to a method and apparatus for detecting frequency channels in a wireless communication system.

2. Background

Wireless communication systems are widely deployed to provide various communication services such as voice and data communication. These wireless systems may be multiple-access systems capable of communicating with multiple wireless devices (e.g., cellular phones) to provide communication services to multiple users. Wireless communication systems may employ various wireless communication technologies including Code Division Multiple Access (CDMA), Time Division Multiple Access (TDMA), Frequency Divisional Multiple Access (FDMA), Orthogonal FDMA (OFDMA), and others. A widely employed example of TDMA is Global System for Mobile communication (GSM). For a given technology, a wireless communication system may transmit and receive signals to and from wireless devices on multiple frequency channels within a frequency band.

A wireless device may be capable of communicating with one or more wireless communication systems. The wireless device may search for available wireless communication systems and frequency channels of the wireless communication systems within its current coverage area. The wireless device may perform this search upon power up, periodically while the wireless device is in an idle mode, and/or when the wireless device loses acquisition of a wireless communication system and/or a frequency channel of the wireless communication system.

To expedite the search for available frequency channels of a wireless communication system, a wireless receiver may first perform a fast search for each frequency channel. In a fast search, the wireless device checks whether receive energy for a frequency channel is above a threshold (e.g., −100 dBm). If the receive energy is above the threshold for the frequency channel, then the wireless device performs a deep search for the frequency channel, which may involve acquiring a pilot signal in the frequency channel, frequency tracking, demodulation, and other operations. Otherwise, the wireless device may discard the frequency channel. The fast search speeds up detection of available frequency channels by screening out frequency channels having receive energy below the threshold. This way, the wireless receiver does not waste time performing a deep search for a frequency channel that is not present. The fast search can greatly reduce the overall search time for frequency channels since a fast search typically takes much less time to perform than a deep search.

However, a fast search may produce a false alarm, in which the fast search falsely detects a frequency channel. This may occur, for example, when two different wireless communication systems have overlapping frequency bands, which can cause one wireless communication system to interfere with the other. For example, a wireless device performing a fast search for a CDMA frequency channel may detect receive energy from a GSM wireless communication system instead, resulting in a false alarm. Due to this false alarm, the wireless device wastes time performing a deep search for the CDMA frequency channel. False alarms may also be caused by other types of interference.

A high rate of false alarms can greatly increase the search time for available frequency channels and diminish the time-saving benefits of the fast search. Also, a false alarm causes a wireless device to consume power performing a deep search for a frequency channel that is not present, which can reduce the battery life of the wireless device.

SUMMARY

In one aspect of the disclosure, a method for detecting the presence of a frequency channel is provided. The method comprises measuring receive energy over a first bandwidth and comparing the measured receive energy over the first bandwidth to a first energy threshold. The method also comprises measuring receive energy over a second bandwidth and comparing the measured receive energy over the second bandwidth to a second energy threshold. The method further comprises detecting the presence of the frequency channel when the measured energy over the first bandwidth is above the first energy threshold and the measured receive energy over the second bandwidth is above the second energy threshold.

In another aspect of the disclosure, an apparatus for detecting the presence of a frequency channel is provided. The apparatus comprises a first energy detection unit configured to measure receive energy over a first bandwidth and a second energy detection unit configured to measure receive energy over a second bandwidth. The apparatus further comprises a processor configured to compare the measured receive energy over the first bandwidth to a first energy threshold, to compare the measured receive energy over the second bandwidth to a second energy threshold, and to detect the presence of the frequency channel when the measured receive energies over the first and second bandwidths are above the first and second energy thresholds, respectively.

In a further aspect of the disclosure, an apparatus for detecting the presence of a frequency channel is provided. The apparatus comprises means for measuring receive energy over a first bandwidth and means for comparing the measured receive energy over the first bandwidth to a first energy threshold. The apparatus also comprises means for measuring receive energy over a second bandwidth and means for comparing the measured receive energy over the second bandwidth to a second energy threshold. The apparatus further comprises means for detecting the presence of the frequency channel when the measured energy over the first bandwidth is above the first energy threshold and the measured receive energy over the second bandwidth is above the second energy threshold.

In yet a further aspect of the disclosure, a machine-readable medium having instructions stored thereon is provided. The instructions are executable by one or more processors and comprise code for measuring receive energy over a first bandwidth and comparing the measured receive energy over the first bandwidth to a first energy threshold. The instructions also comprise code for measuring receive energy over a second bandwidth and comparing the measured receive energy over the second bandwidth to a second energy threshold. The instructions further comprise code for detecting the presence of the frequency channel when the measured energy over the first bandwidth is above the first energy threshold and the measured receive energy over the second bandwidth is above the second energy threshold.

In yet a further aspect of the disclosure, an apparatus for detecting the presence of a frequency channel is provided. The apparatus comprises at least one processor configured to receive measured receive energy over a first bandwidth and compare the measured receive energy over the first bandwidth to a first energy threshold. The at least one processor is also configured to receive measured energy over a second bandwidth and compare the measured receive energy over the second bandwidth to a second energy threshold. The at least one processor is further configured to detect the presence of the frequency channel when the measured receive energies over the first and second bandwidths are above the first and second energy thresholds, respectively.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
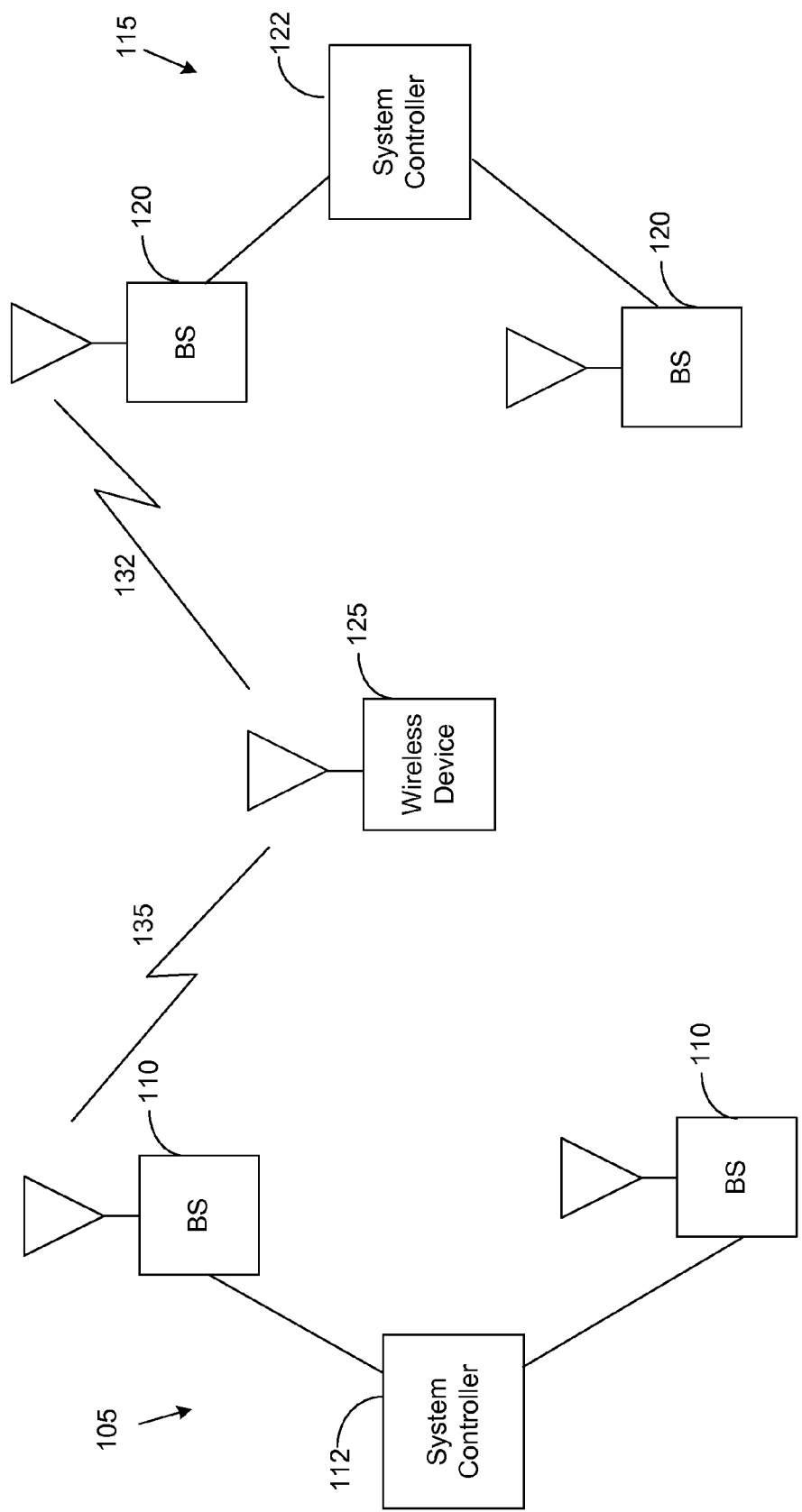
FIG. 1 is a conceptual block diagram of multiple wireless communication systems according to an aspect of the disclosure.

FIG. 1 shows a conceptual diagram of multiple wireless communication systems 105 and 115 according to an aspect of the present disclosure. Each wireless communication system 105 and 115 may comprise multiple base stations (BSs) 110 and 120, respectively, for transmitting and receiving wireless signals to and from wireless devices. Each wireless communication system 105 and 115 also comprises a system controller 112 and 122 for controlling and coordinating activities of the corresponding base stations 110 and 120. Although two wireless communication systems are shown in FIG. 1, any number of wireless communication systems may be present.

The base stations 110 and 120 for each wireless communication system 105 and 115 may be distributed over a geographical area to provide a coverage area for the respective system. Although only two base stations 110 and 120 are shown for each wireless communication system 105 and 115 in the example in FIG. 1, a wireless communication system may comprise any number of base stations. Each base station 110 and 120 may also be referred to as an access point or a node of the respective wireless communication system 105 and 115.

The wireless communication systems 105 and 115 may employ any one of a number of different wireless communication technologies to communicate with wireless devices. Examples of wireless communication technologies include CDMA, TDMA, FDMA, OFDMA, and others. Examples of CDMA include cdma2000 and Wideband-CDMA (W-CDMA). Cdma2000 may include the IS-95, IS-2000, and IS-856 standards. Examples of TDMA include GSM and Digital Advanced Mobile Phone System (D-AMPS). For example, wireless communication system 105 may employ CDMA and wireless communication system 115 may employ GSM.

Each wireless communication system 105 and 115 may also transmit and receive wireless signals on multiple frequency channels within a frequency band. The wireless communication systems 105 and 115 may have overlapping frequency bands. For example, a CDMA wireless communication system and a GMS wireless communication system may have overlapping frequency bands. Each frequency channel in a CDMA wireless communication system may have a bandwidth of about 1.25 MHz, and each frequency channel in a GSM wireless communication system may have a bandwidth of about 200 KHz.

FIG. 1 shows an example of a wireless device 125, which may communicate with wireless communication system 105 and/or wireless communication system 115 via wireless links 135 and/or 132, respectively, to provide a user with wireless service. The wireless device 125 may comprise a cellular phone, a Personal Digital Assistant (PDA), a pager, a data transceiver, or other wireless device. The wireless device 125 may also be referred to as a mobile station (MS), user equipment (UE), a wireless terminal, or a subscriber unit.

The wireless device 125 may search for available wireless communication systems and/or frequency channels of a wireless communication system within its coverage area. The wireless device 125 may perform this search upon power up, periodically while the wireless device 125 is in an idle mode, and/or when the wireless device 125 loses acquisition of a wireless communication system and/or a frequency channel.

In one aspect, the wireless device 125 may include a Preferred Roaming List (PRL) stored in memory. The PRL may include a list of different wireless communication systems with which the wireless device 125 can communicate. The wireless communication systems in the PRL may be listed in order of priority. For each wireless communication system in the PRL, the PRL may also include a list of frequency channels for the wireless communication system. The frequency channels for each wireless communication system may also be listed in order of priority. The PRL may include all or a subset of the frequency channels for a wireless communication system. In this aspect, the wireless device 125 may search for a wireless communication system starting with the wireless communication system having the highest priority in the PRL. For each wireless communication system, the wireless device 125 may search for frequency channels of the wireless communication system in order of priority. When the wireless device 125 has detected a frequency channel, the wireless device 125 may acquire the frequency channel to obtain wireless service and/or store acquisition information for the frequency channel in memory so that the wireless device can quickly acquire the frequency channel, e.g., in case the wireless devices loses acquisition of another frequency channel.

Figure 2:
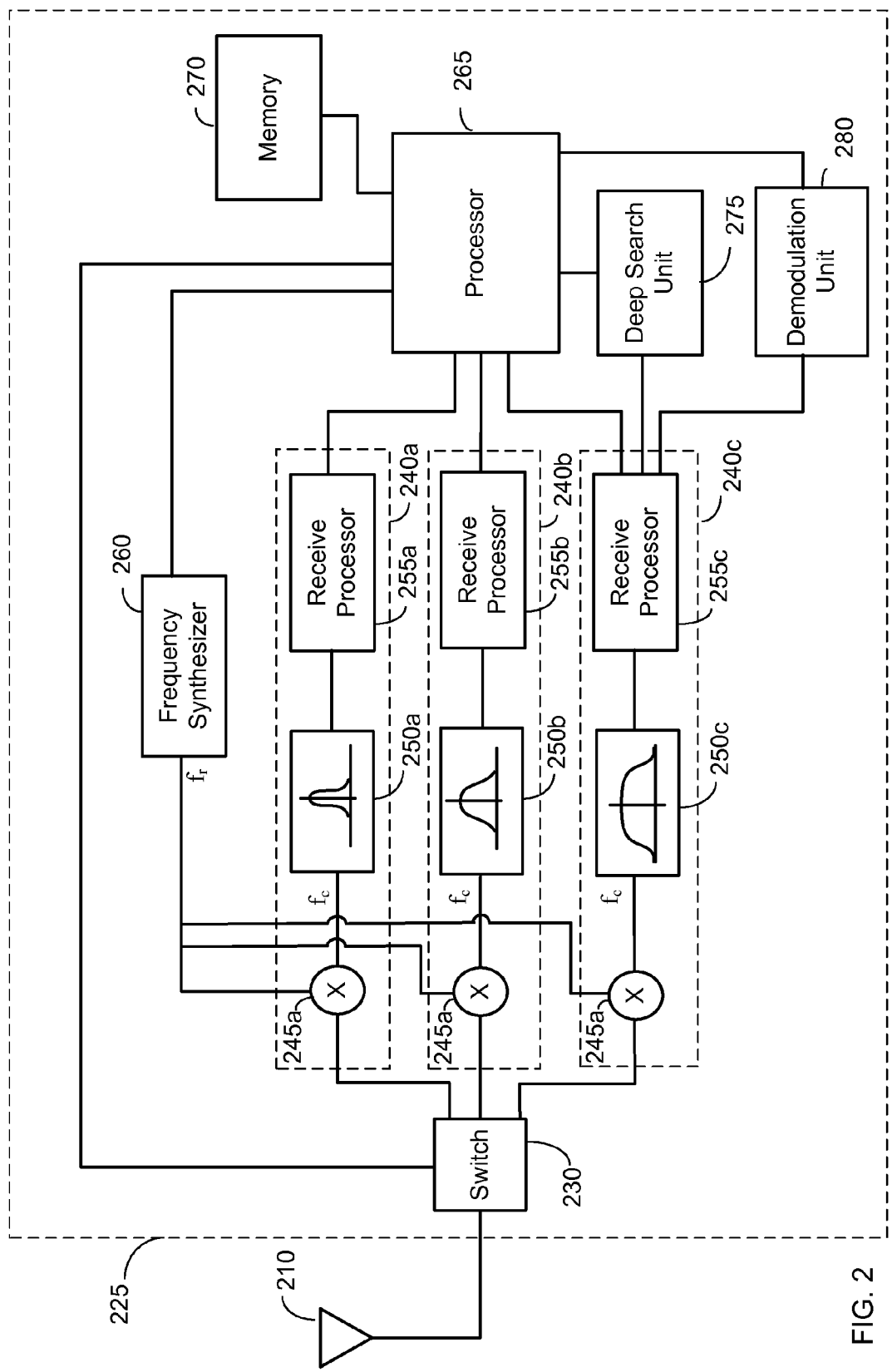
FIG. 2 is a conceptual block diagram of a wireless device according to an aspect of the disclosure.

FIG. 2 is a conceptual block diagram of a wireless receiver 225 according to an aspect of the disclosure. The wireless receiver 225 may be part of the wireless device 125 shown in FIG. 1. The wireless receiver 225 reduces the number of false alarms during a fast search by distinguishing between receive energy from a desired wireless communication system and receive energy from other wireless communication systems and/other interference sources, as described in further detail below.

The wireless receiver 225 comprises an antenna 210, a switch 230, and three energy detection units 240a-240c coupled to the switch 230. Each energy detection unit 240a-240c comprises a mixer 245a-245c, a band pass filter 250a-250c, and a receive processor 255a-255c. The switch 230 is used to selectively couple a receive signal from the antenna 210 to the energy detection units 240a-240c. In one aspect, the energy detection units 240a-240c are configured to measure receive energy over different frequency bandwidths, as discussed further below.

The wireless receiver 225 also comprises a frequency synthesizer 260, a processor 265, a memory 270, a deep search unit 275 and a demodulation unit 280. The frequency synthesizer 260 is coupled to the mixers 245a-2450c of the energy detection units 240a-240c, and is used to select a frequency channel to be searched, as discussed further below. The processor 270 is coupled to the energy detection units 240a-240c, and is configured to perform a fast search for a frequency channel of a wireless communication system and to detect a frequency channel based on energy measurements from the energy detection units 240a-240a, as discussed further below. The deep search unit 275 is configured to perform a deep search for a frequency channel after the frequency channel has been detected during a fast search. The deep search may involve acquiring a pilot signal in the frequency channel, frequency tracking and other operations. The demodulation unit 280 is configured to demodulate and/or decode a received signal to recover data in the received signal. The recovered data may be provided to the processor 265 for further processing.

Although the processor 265, deep search unit 275 and demodulation unit 280 are shown separately in FIG. 2, their operations may be performed by the same processor or a plurality of processors. Although FIG. 2 only shows receive paths for the wireless device 225 for ease of illustration, the wireless device 225 may also include one or more transmission paths, e.g., for transmitting data to a wireless communication system.

As discussed above, the energy detection units 240a-240c are configured to measure receive energy over different frequency bandwidths. To do this, the band pass filters 250a-250c of the energy detection units 240a-240c may have different bandwidths. In one aspect, band pass filter 250a has the narrowest bandwidth, band pass filter 240c has the widest bandwidth, and band pass filter 250b has a bandwidth that is between the bandwidths of band pass filters 250a and 250c. The band pass filters 250a-250c may all be centered at the same center frequency $f_c$ as shown in the example in FIG. 2 or at different center frequencies.

Each receive processor 255a-255c is configured to process the signal from the respective band pass filter 250a-250c. The signal processing may include amplifying, filtering and frequency down-converting to an intermediate frequency and/or baseband. In one aspect, each receive processor 225a-255c measures the energy of the signal from the respective band pass filter 250a-250c. For example, each receive processor 255a-255c may include an Automatic Gain Control (AGC) unit that measures the energy of the signal and controls amplification of the signal based on the measured energy. In this aspect, each receive processor 240a-240c may use its AGC unit to measure the energy of the signal from the respective band pass filter and report the measured energy to the processor 265. Since each band pass filter 250a-250c has a different bandwidth, the measured energy from the receive processors 255a-255c are over different bandwidths. As discussed further below, the processor 265 uses the measured energy over different bandwidths to detect a frequency channel of a desired wireless communication system during a fast search.

In one example, the wireless receiver 225 is able to perform a fast search for frequency channels of a CMDA wireless communication system while reducing false alarms due to a GSM wireless communication system and/or other interference source. In this example, each frequency channel in the CDMA wireless communication system may have a bandwidth of about 1.25 MHz, and each frequency channel in the GSM wireless communication system may have a bandwidth of about 200 KHz.

Figure 3A:
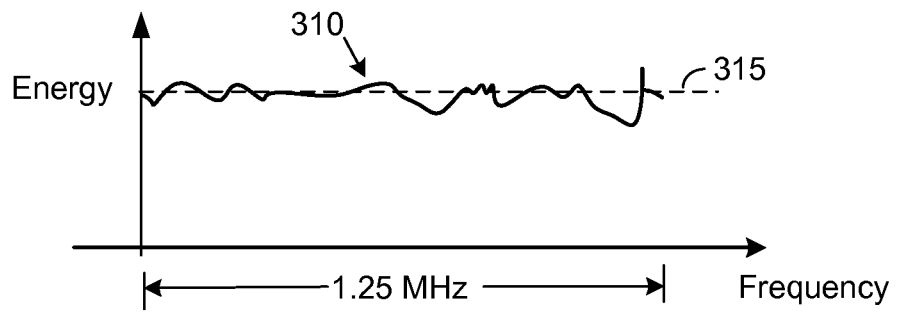
FIG. 3a is a plot of energy versus frequency for an example of a CDMA channel.
Figure 3B:
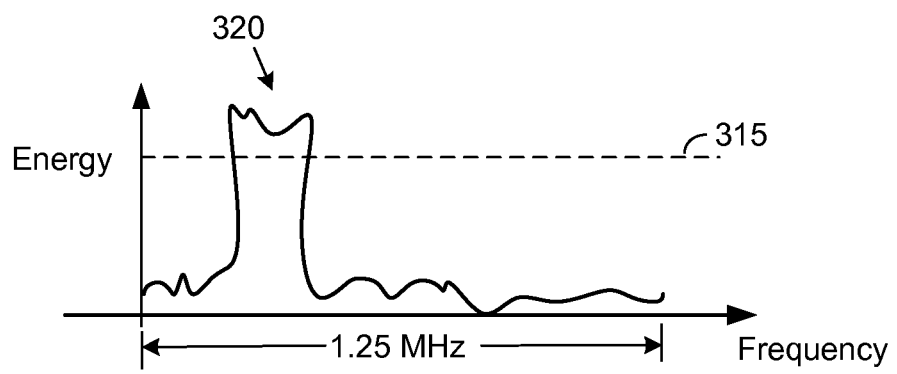
FIG. 3b is a plot of energy versus frequency for an example of a GSM channel.

FIG. 3a shows a plot of energy versus frequency for an exemplary CDMA frequency channel, and FIG. 3b shows a plot of energy versus frequency for an exemplary GSM frequency channel. As shown in FIG. 3a, the energy 310 of the CDMA frequency channel is consistently strong over a bandwidth of 1.25 MHz with average energy level 315. In contrast, the energy 320 of the GMS frequency channel is only strong over a narrower bandwidth of about 200 KHz. As discussed further below, band pass filters 250b and 250c may have bandwidths of about 200 KHz and 1.25 MHz, respectively, to distinguish between CDMA and GSM frequency channels.

Operations of the wireless receiver 225 will now be described according to one aspect of the disclosure. The following description refers to the example of CDMA and GSM frequency channels, although it is to be understood that other types of frequency channels may be used.

To perform a search for available wireless communication systems and frequency channels within the coverage area of the wireless receiver 225, the processor 265 may first retrieve a PRL from memory 270. The processor 265 may then search for wireless communication systems and corresponding frequency channels from the PRL in order of their priority in the PRL. The processor 265 may perform this search upon power up, periodically while the wireless receiver 225 is in an idle mode, and/or when the wireless receiver 225 loses acquisition of a wireless communication system and/or frequency channel.

For each frequency channel to be searched, the processor 265 first performs a fast search to determine whether the frequency channel is present. If the processor 265 does not detect the frequency channel during the fast search, then the processor 265 may discard the frequency channel, and search for the next frequency channel in the PRL. If the processor 265 detects the frequency channel during the fast search, then the processor 265 may instruct the deep search unit 275 to perform a deep search for the frequency channel.

During the deep search, the deep search unit 275 may acquire a pilot signal in the frequency channel, for example, by correlating the frequency channel with different PN sequences and PN offsets until the pilot signal is acquired. The pilot signal allows the wireless device 225 to receive voice and/or data on the frequency channel by providing, e.g., a phase reference for coherent demodulation and timing. The deep search unit may also perform other operations.

Thus, the deep search unit 275 obtains information (e.g., pilot signal) for acquiring the frequency channel. After the deep search is completed for a frequency channel, the processor 265 may store the acquisition information for the frequency channel in memory 275 so that the wireless device 265 can quickly acquire the frequency channel. For example, the wireless device 225 may use the stored acquisition information to acquire the frequency channel when the wireless receiver 225 loses acquisition of another frequency channel. This allows the wireless device 225 to continue wireless service when the other frequency channel is lost.

Operations for performing a fast search of a frequency channel will now be described according to one aspect of the disclosure. The operations are discussed using an example in which the fast search is configured to detect a CDMA frequency channel, although it is to be understood that other types of frequency channels may be detected.

First, the processor 265 tunes the center frequency of a receive signal corresponding to a desired frequency channel to the center frequency $f_c$ of the band pass filters 250a-250c. For example, the processor 265 may instruct the frequency synthesizer 260 to output a reference frequency $f_r$ that is mixed with a receive signal corresponding to the desired frequency channel by the mixers 245a-245c to tune the center frequency of the receive signal to the center frequency $f_c$ of the band pass filters 250a-250c.

The processor 265 may then instruct the switch 230 to sequentially couple the receive signal from the antenna 210 to the three energy detection units 245a-245c to sequentially measure receive energy over different bandwidths. In one example, the band pass filters 250a-250c have bandwidths of 10 KHz, 200 KHz and 1.25 MHz, respectively, to detect a CDMA frequency channel.

First, the processor 265 couples the receive signal to energy detection unit 245a and receives an energy measurement over a narrow bandwidth (e.g., 10 KHz) from energy detection unit 245a. The processor 265 then compares the received energy measurement to an energy threshold L1. If the energy measurement is above the energy threshold L1, then the processor 265 continues the fast search. If the energy measurement is below the energy threshold L1, then the processor 265 ends the fast search for the current frequency channel and goes to the next frequency channel in the PRL. Further, the processor 265 may declare that there is no valid wireless communication system present at the current frequency channel.

Second, the processor 265 couples the receive signal to energy detection unit 245b and receives an energy measurement over an intermediate bandwidth (e.g., 200 KHz) from the energy detection unit 245b. The processor 265 then compares the received energy measurement to an energy threshold L2. If the energy measurement is above the energy threshold L2, then the processor 265 continues the fast search. If the energy measurement is below the energy threshold L2, then the processor 265 ends the fast search for the current frequency channel and goes to the next frequency channel in the PRL.

Third, the processor 265 couples the receive signal to energy detection unit 245c and receives an energy measurement over a wide bandwidth (e.g., 1.25 MHz) from the energy detection unit 245c. The processor 256 then compares the received energy measurement to an energy threshold L3. If the energy measurement is above the energy threshold L3, then the processor 265 determines that the frequency channel is present, and continues with a deep search for the frequency channel. If the energy measurement is below the energy threshold L3, then the processor 265 determines that the frequency channel is not present. When this occurs, the processor 265 may determine that a non-CDMA wireless communication system is present at the frequency channel and store this information in memory 270. The wireless device 225 may also record the location of the wireless device 225 where the non-CDMA frequency channel was detected in memory 270. When the wireless device 225 performs a search at or near the same location in the future, the wireless device 225 may use this stored information to identify the frequency channel as a non-CDMA channel and skip this frequency channel in the search.

The energy thresholds L1, L2 and L3 may be the same or different and may be given as a total energy or an average energy over bandwidth. Also, the measured energy for each bandwidth may be given as a total energy or an average energy over the bandwidth.

Thus, the processor 265 in this example determines that the desired frequency channel is present if the energy measurements over all three bandwidths are above the respective energy thresholds. For the example of a CDMA frequency channel, the processor 265 detects the CDMA frequency channel when the energy measurements over all three bandwidths are above the respective energy thresholds. This is because the CDMA frequency channel is a wide band signal (compared with GSM), and therefore the receive energy from the CDMA frequency channel is consistently strong over all three bandwidths (e.g., 10 KHz, 200 KHz, and 1.25 MHz). On the other hand, a GSM frequency channel is a narrow band signal (compared with CDMA), and therefore is not consistently strong over all three bandwidths. Thus, the fast search according to this aspect is able to detect the presence of the CDMA frequency channel while greatly reducing the rate of false alarms from GSM frequency channels or other narrow bandwidth interferences (compared with CDMA).

Although, the fast search according to the above aspect was described using the example of CDMA and GSM frequency channels, the fast search may be used to reduce the rate of false alarms for other types of frequency channels, in which the frequency channel of interest has a different bandwidth than interfering frequency channels and/or other interferences.

Further, although the receive energy in the above example was measured over three different bandwidths, the receive energy may be measured over two different bandwidths or more than three different bandwidths. In these cases, the processor 265 may detect a desired channel frequency when the measured energy over all of the bandwidths are above respective energy thresholds. Further, the processor 265 may sequentially compare the measured energy for the different bandwidths to the respective energy thresholds in order of increasing bandwidth. If a measured energy for one of the bandwidths is below the respective threshold, then the processor 265 may end the fast search for the current frequency channel, and search for the next frequency channel in the PRL.

Figure 4:
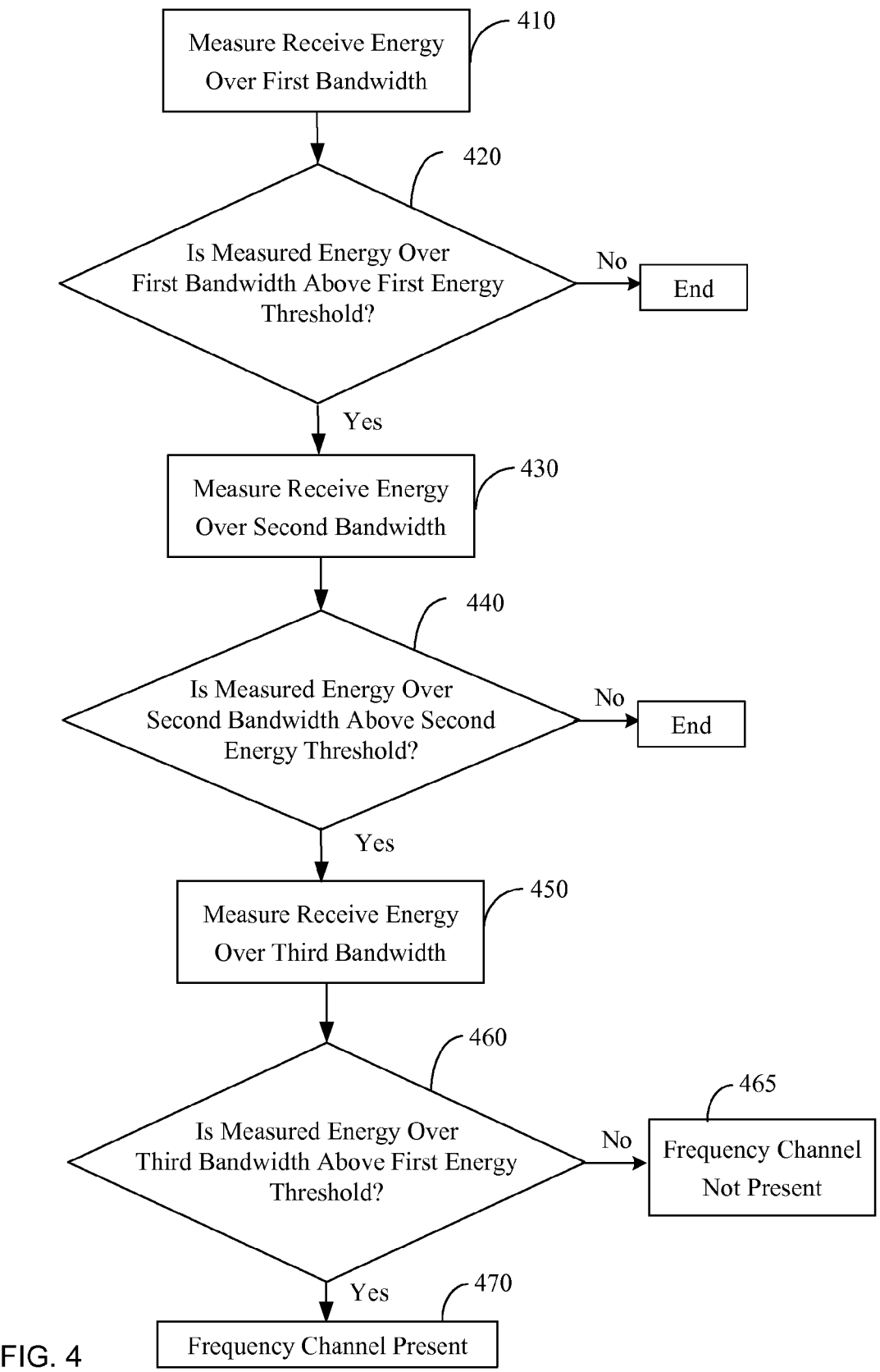
FIG. 4 is flowchart of a process for channel searching according to an aspect of the disclosure.

FIG. 4 is a flow diagram of a fast search process for a frequency channel of interest according to an aspect of the disclosure. The fast search process may be performed by the processor 265.

In operation 410, the process measures receive energy over a first bandwidth. The first bandwidth may be a narrow bandwidth (e.g., 10 KHz).

From operation 410, the process continues to operation 420 where the measured energy over the first bandwidth is compared to a first energy threshold. If the measured energy is not above the first energy threshold, then the process ends. At this point, the processor 265 may search for the next frequency channel in the PRL. If the measured energy is above the first energy threshold, then the process continues to operation 430.

In operation 430, the process measures receive energy over a second bandwidth. The second bandwidth may be an intermediate bandwidth (e.g., 200 KHz).

From operation 430, the process continues to operation 440 where the measured energy over the second bandwidth is compared to a second energy threshold. If the measured energy is not above the second energy threshold, then the process ends. At this point, the processor 265 may search for the next frequency channel in the PRL. If the measured energy is above the second energy threshold, then the process continues to operation 450.

In operation 450, the process measures receive energy over a third bandwidth. The third bandwidth may be a wide bandwidth (e.g., 1.25 MHz).

From operation 450, the process continues to operation 460 where the measured energy over the third bandwidth is compared to a third energy threshold. If the measured energy is not above the third energy threshold, then the process determines that the frequency channel of interest is not present in operation 465. If the measured energy is above the third energy threshold, then the process determines that the frequency channel of interest is present in operation 470. At this point, the processor 265 may proceed with a deep search for the frequency channel.

The first, second and third energy thresholds may be the same or different and may be given as a total energy or an average energy over bandwidth. Also, the measured energy for each bandwidth may be given as a total energy or an average energy over the bandwidth.

For the example where the frequency channel is a CDMA frequency channel, the processor 265 may declare a valid CDMA wireless communication system when the CDMA frequency channel is detected in operation 470. The exemplary bandwidths of 200 KHz and 1.25 MHz may be used to detect a CDMA frequency channel having a bandwidth of 1.25 MHz while screening out GSM frequency channels having a bandwidth of 200 KHz. Other bandwidths may be used, e.g., depending on the bandwidth of a desired frequency channel and the bandwidth of potentially interfering frequency channels.

In the above example, when the measured energy over the second bandwidth is above the second threshold, but the measured energy over the third bandwidth is below the third threshold, the processor 265 may determine that a GSM channel is present at the corresponding frequency channel and store this information in the memory 270. For a wireless device 225 capable of using both CDMA and GSM, the wireless device 225 may use this information to perform a search for this frequency channel when searching for available GSM channels.

During a fast search, the processor 265 may also compare the measured energy over two different bandwidths to determine whether a frequency channel is present. For example, the processor may compare the measured energy over the bandwidths of 200 KHz and 1.25 MHz. In this example, the average energy over bandwidth for a CDMA frequency channel should be approximately the same for both bandwidths. This is because the energy level for the CDMA frequency channel is fairly consistent across a 1.25 MHz bandwidth. However, the average energy over bandwidth for a GSM frequency channel would be much different for both bandwidths. For example, for a GSM frequency channel centered at the 200 KHz bandwidth, the average energy over bandwidth for the GSM frequency channel would decrease for the 1.25 MHz bandwidth. This is because the GSM frequency channel would not have appreciable energy outside the 200 KHz bandwidth, and therefore its average energy over bandwidth would decrease as the bandwidth is increased from 200 KHz to 1.25 MHz. Thus, in this example, the processor 265 may compare the measured average energy over bandwidth for both bandwidths (e.g., 200 KHz and 1.25 MHz) and detect a CDMA frequency channel if the measured average energies are approximately the same, for example, within 10% of each other.

Figure 5:
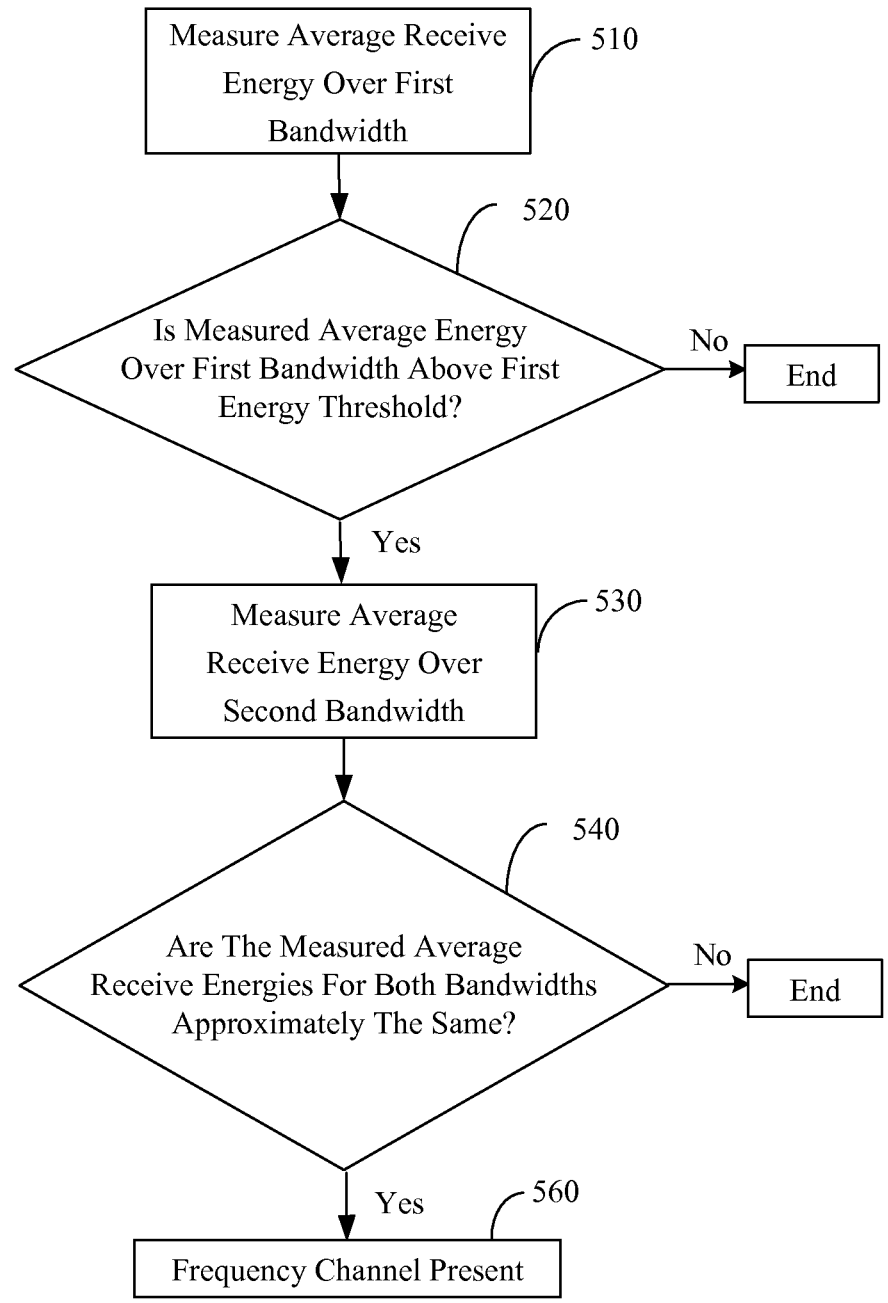
FIG. 5 is a flowchart of a process for detecting a frequency channel according to an aspect of the disclosure.

FIG. 5 is a flowchart of a process for performing the above comparison according to an aspect of the disclosure. In operation 510, the process measures average receive energy over a first bandwidth (e.g., 200 KHz).

From operation 510, the process continues to operation 520 where the measured average energy over the first bandwidth is compared to a first energy threshold. If the measured average energy is not above the first energy threshold, then the process ends. If the measured average energy is above the first energy threshold, then the process continues to operation 530.

In operation 530, the process measures average receive energy over a second bandwidth (e.g., 1.25 MHz) and checks whether the energy is above the first energy threshold. If the energy is above the first energy threshold, then the process proceeds to operation 540.

In operation 540, the process compares the measured average energies for both bandwidths. If the measured average energies are approximately the same, then the process determines that a CDMA frequency channel is present. For example, the process may determine that the measured average energies are the same if they are within 10% or less of each other. Otherwise, the process determines that a CDMA frequency channel is not present. The process in FIG. 5 may be performed in combination with the process in FIG. 4.

Figure 6:
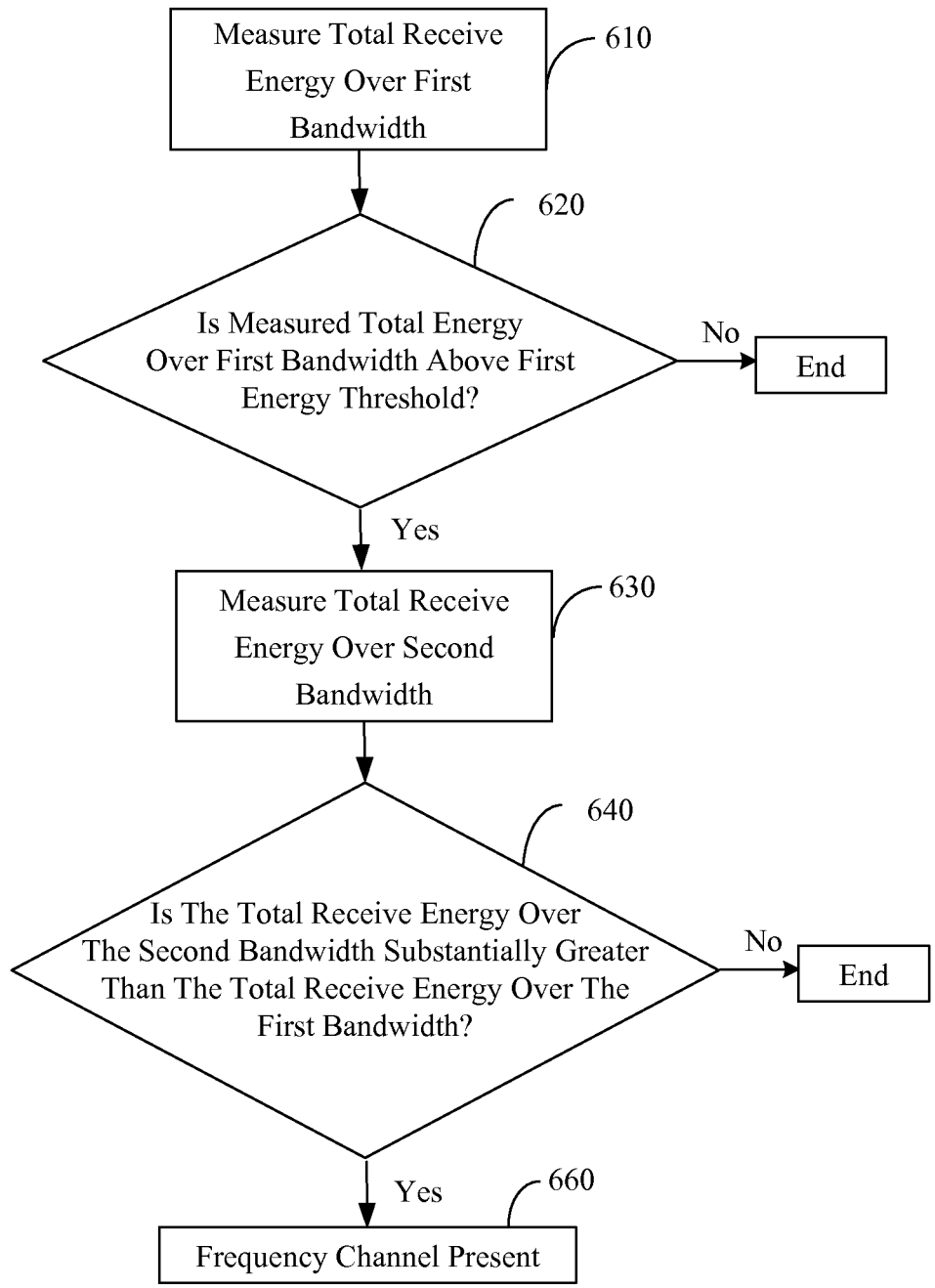
FIG. 6 is a flowchart of a process for detecting a frequency channel according to another aspect of the disclosure.

FIG. 6 is a flowchart of a process for performing the above comparison according to an aspect of the disclosure. In operation 610, the process measures total receive energy over a first bandwidth (e.g., 200 KHz)

From operation 610, the process continues to operation 620 where the measured total energy over the first bandwidth is compared to a first energy threshold. If the measured total energy is not above the first energy threshold, then the process ends. If the measured total energy is above the first energy threshold, then the process continues to operation 630.

In operation 630, the process measures total receive energy over a second bandwidth (e.g., 1.25 MHz).

From operation 630, the process continues to operation 640 where the measured total energies for both bandwidths are compared to each other. If the measured total energy for the second bandwidth is substantially greater than the measured total energy for the first bandwidth, then the process determines that a CDMA frequency channel is present. Otherwise, the process determines that a CDMA frequency channel is not present.

As discussed above, a wireless device 225 may search for available wireless communication systems and/or frequency channels while the wireless device is in an idle mode. For example, a wireless device 225 may be in the idle mode when the wireless device periodically wakes up (e.g., every 1.25 seconds) from a sleep state to monitor a base station for an incoming call (e.g., page signal). In this example, the wireless device 225 may perform a search for available wireless communication systems and/or frequency channels for a time interval each time the wireless device wakes up from the sleep state to monitor the base station.

The wireless device 225 may also perform a search for available wireless communication systems and/or frequency channels when the wireless device is in a connected mode. For example, the wireless device 225 may be in the connected mode with a base station when the wireless device is actively exchanging voice and/or data with the base station. In this example, the wireless device 225 may perform the above search between receptions of voice and/or data from the base station so that the search does not interrupt service. If a second antenna is available, the wireless device can perform the search in the background without interrupting the service connection.

When the wireless device 225 acquires a frequency channel during a deep search, the wireless device may store acquisition information for the frequency channel in memory 270. The wireless device 225 may also record the location of the wireless device 225 where the frequency channel was detected in memory 270. The wireless device 225 may determine its location using a satellite positing system such as GPS, Galileo, GLONASS, or using another positioning system. When the wireless device 225 is at or near the same location in the future, the wireless device 225 may use the stored information to quickly locate available frequency channels in its coverage area.

Figure 7:
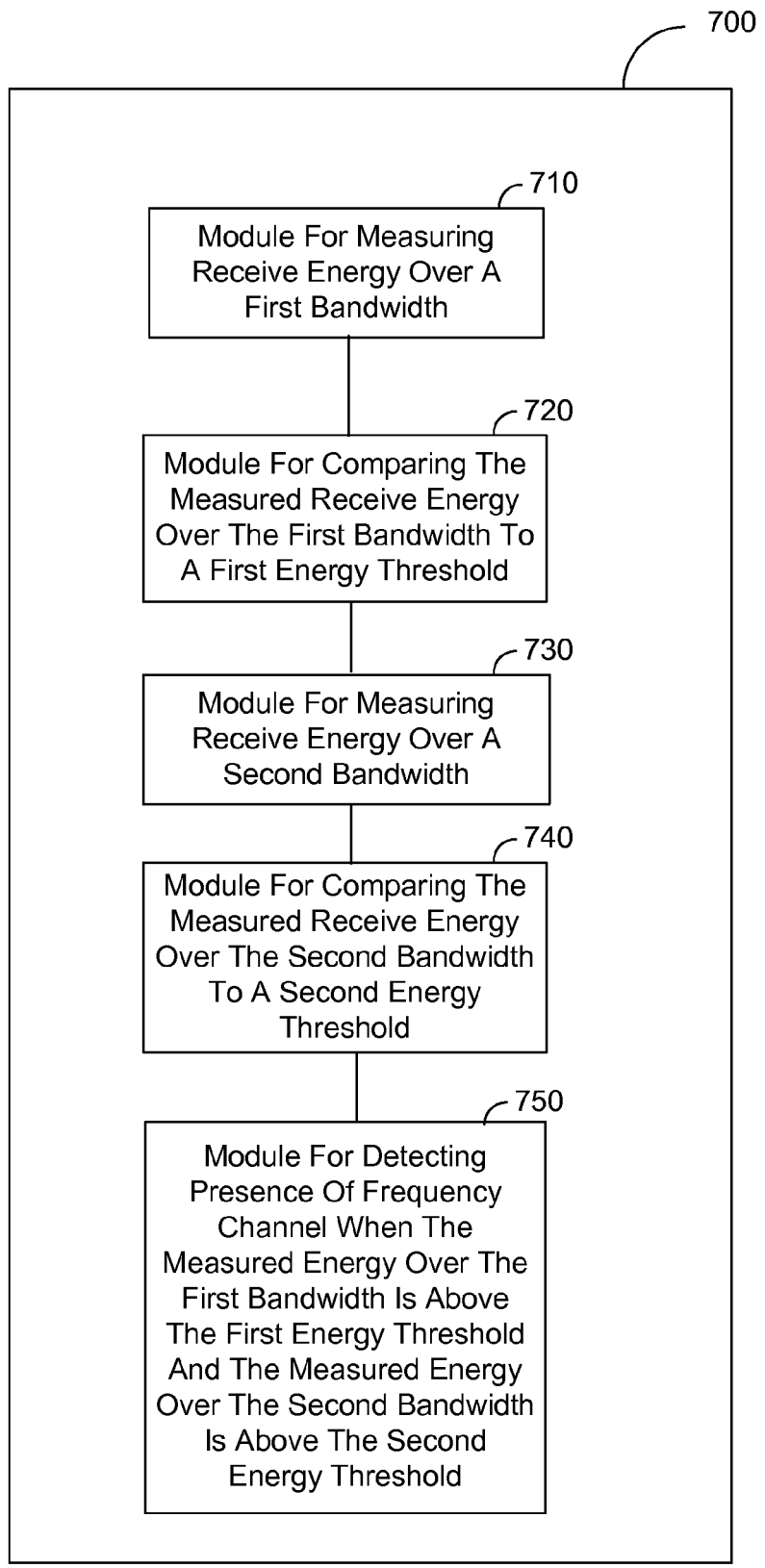
FIG. 7 is a conceptual block diagram illustrating the functionality of an apparatus for detecting the presence of a frequency channel according to an aspect of the disclosure.

FIG. 7 is a conceptual block diagram illustrating the functionality of an apparatus for detecting the presence of a frequency channel according to an aspect of the disclosure. Apparatus 700 includes a module 710 for measuring receive energy over a first bandwidth and module 720 for comparing the measured receive energy over the first bandwidth to a first energy threshold. Apparatus 700 also includes module 730 for measuring receive energy over a second bandwidth and module 740 for comparing the measured receive energy over the second bandwidth to a second energy threshold. Apparatus 700 further includes module 750 for detecting the presence of the frequency channel when the measured energy over the first bandwidth is above the first energy threshold and the measured receive energy over the second bandwidth is above the second energy threshold.

Figure 8:
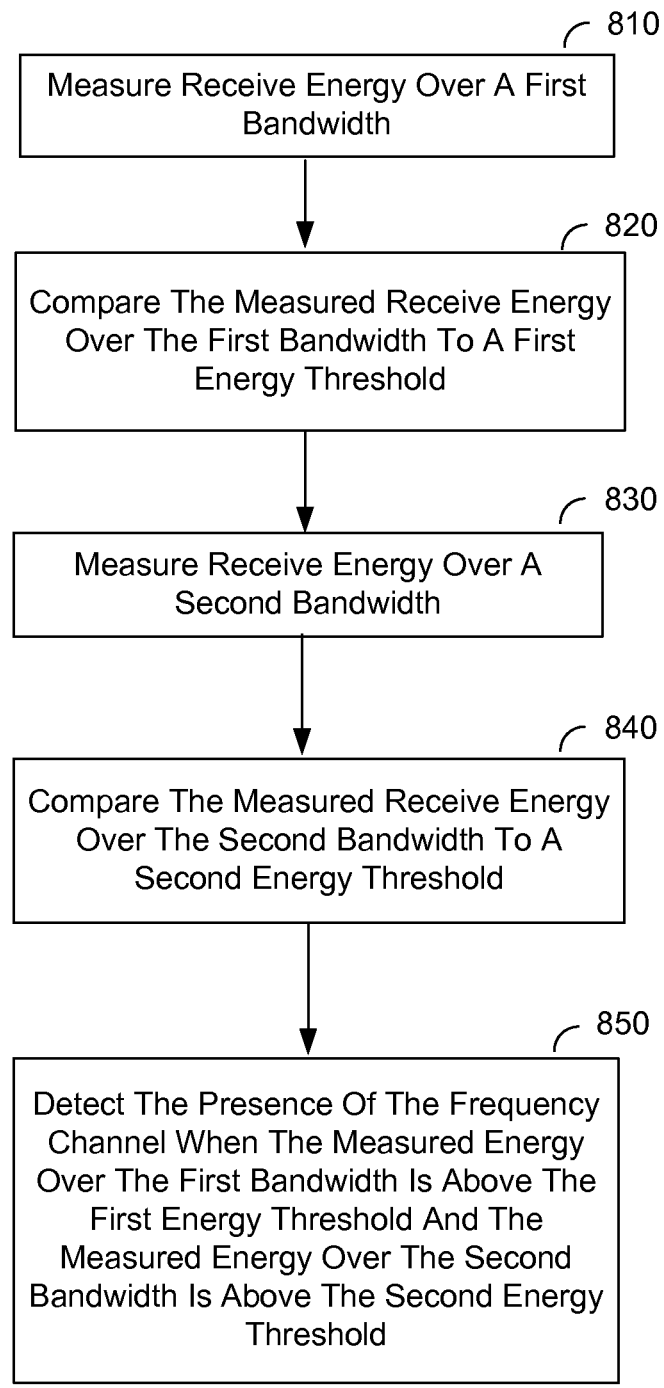
FIG. 8 is a flowchart of a process for detecting a frequency channel according to yet another aspect of the disclosure.

FIG. 8 is a flowchart illustrating a process for detecting the presence of a frequency channel according to an aspect of the disclosure. The process measures receive energy over a first bandwidth in step 810 and compares the measured receive energy over the first bandwidth to a first energy threshold in step 820. The process measures receive energy over a second bandwidth in step 830 and compares the measured receive energy over the second bandwidth to a second energy threshold in step 840. In step 850, the process detects the presence of the frequency channel when the measured energy over the first bandwidth is above the first energy threshold and the measured receive energy over the second bandwidth is above the second energy threshold.

The methodologies described herein may be implemented by various means depending upon the application. For example, these methodologies may be implemented in hardware, firmware, software or a combination thereof. For a hardware implementation, the processors may be implemented within one or more application specific integrated circuits (ASICs), digital signal processors (DSPs), digital signal processing devices (DSPDs), programmable logic devices (PLDs), filed programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example software codes may be stored in memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The memories described in the disclosure may comprise machine readable media. Machine readable media may include storage integrated into a processor, such as might be the case with an ASIC, and/or storage external to a processor. By way of illustration, and not limitation, readable media may include one or more of volatile memory, nonvolatile memory, a Random Access Memory (RAM), a flash memory, a Read Only Memory (ROM), a Programmable Read-Only Memory (PROM), an Erasable PROM (EPROM), a register, a hard disk, a removable disk, a CD-ROM, a DVD, or any other suitable storage device. In addition, readable media may include a transmission line or a carrier wave that encodes a data signal. A readable medium may be a machine readable media encoded or stored with a computer program or instructions. The computer program or instructions may be executable by a transmitter or receiver device or by a processor of a transmitter or receiver device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

Examples of particular communications protocols and formats have been given to illustrate the subject technology. However, the subject technology is not limited to these examples and applies to other communications protocols and formats.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the deep scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for detecting the presence of a frequency channel, comprising:
    measuring receive energy over a first bandwidth;
    comparing the measured receive energy over the first bandwidth to a first energy threshold;
    measuring receive energy over a second bandwidth;
    comparing the measured receive energy over the second bandwidth to a second energy threshold;
    detecting the presence of the frequency channel when the measured energy over the first bandwidth is above the first energy threshold and the measured receive energy over the second bandwidth is above the second energy threshold;
    comparing the measured receive energy over the first bandwidth with the measured receive energy over the second bandwidth; and
    alternately detecting the presence of the frequency channel when the measured receive energies over the first and second bandwidths are approximately the same.

2. The method of claim 1, wherein the first bandwidth is approximately 200 KHz and the second bandwidth is wider than 200 KHz.

3. The method of claim 1, wherein the second bandwidth is approximately 1.25 MHz and the first bandwidth is narrower than 1.25 MHz.

4. The method of claim 1, wherein the first and second bandwidths are approximately centered at the same center frequency.

5. The method of claim 1, wherein:
    measuring receive energy over the first bandwidth comprises measuring an average receive energy over the first bandwidth;
    measuring receive energy over the second bandwidth comprises measuring an average receive energy over the second bandwidth;
    comparing measured receive energies comprises comparing the measured average receive energy over the first bandwidth with the measured average receive energy over the second bandwidth; and
    alternately detecting the presence of the frequency channel when the measured receive energies are approximately the same comprises detecting the presence of the frequency channel when the measured average receive energies over the first and second bandwidths are approximately the same.

6. The method of claim 5, wherein the second bandwidth is approximately 1.25 MHz and the first bandwidth is narrower than 1.25 MHz.

7. The method of claim 1, wherein:
    measuring receive energy over the first bandwidth comprises measuring a total receive energy over the first bandwidth;
    measuring receive energy over the second bandwidth comprises measuring a total receive energy over the second bandwidth;
    comparing measured receive energies comprises comparing the measured total receive energy over the first bandwidth with the measured total receive energy over the second bandwidth; and
    alternately detecting the presence of the frequency channel when the measured receive energies are approximately the same comprises detecting the presence of the frequency channel when the measured total receive energy over the second bandwidth is substantially greater than the measured total receive energy over the first bandwidth.

8. The method of claim 7, wherein the second bandwidth is approximately 1.25 MHz and the first bandwidth is narrower than 1.25 MHz.

9. The method of claim 1, further comprising:
    measuring receive energy over a third bandwidth; and
    comparing the measured receive energy over the third bandwidth to a third energy threshold;
    wherein the presence of the frequency channel is detected when the measured energies over the first, second and third bandwidths are above the first, second, and third energy thresholds, respectively.

10. The method of claim 9, wherein the second bandwidth is narrower than the third bandwidth, and the first bandwidth is narrower than the second bandwidth.

11. An apparatus for detecting the presence of a frequency channel, comprising:
    a first energy detection unit configured to measure receive energy over a first bandwidth;
    a second energy detection unit configured to measure receive energy over a second bandwidth; and
    a processor configured to compare the measured receive energy over the first bandwidth to a first energy threshold, to compare the measured receive energy over the second bandwidth to a second energy threshold, and to detect the presence of the frequency channel when the measured receive energies over the first and second bandwidths are above the first and second energy thresholds, respectively;
    wherein the processor is further configured to compare the measured receive energy over the first bandwidth with the measured receive energy over the second bandwidth and to alternately detect the presence of the frequency channel when the measured receive energies over the first and second bandwidths are approximately the same.

12. The apparatus of claim 11, wherein the first bandwidth is approximately 200 KHz and the second bandwidth is wider than 200 KHz.

13. The apparatus of claim 11, wherein the second bandwidth is approximately 1.25 MHz and the first bandwidth is narrower than 1.25 MHz.

14. The apparatus of claim 11, wherein the first and second bandwidths are approximately centered at the same center frequency.

15. The apparatus of claim 11, wherein the first energy detection unit comprises a first band pass filter having the first bandwidth and the second detection unit comprises a second band pass filter having the second bandwidth.

16. The apparatus of claim 11, wherein the frequency channel is a CDMA frequency channel.

17. The apparatus of claim 11, wherein the first energy detection unit is configured to measure an average receive energy over the first bandwidth, the second detection unit is configured to measure an average receive energy over the second bandwidth, and the processor is configured to compare the measured average receive energy over the first bandwidth with the measured average receive energy over the second bandwidth and to detect the presence of the frequency channel when the measured average receive energies over the first and second bandwidths are approximately the same.

18. The apparatus of claim 11, wherein the first energy detection unit is configured to measure a total receive energy over the first bandwidth, the second detection unit is configured to measure a total receive energy over the second bandwidth, and the processor is configured to compare the measured total receive energy over the first bandwidth with the total average receive energy over the second bandwidth and to detect the presence of the frequency channel when the measured total receive energy over the second bandwidth is substantially greater then the measured total energy over the first bandwidth.

19. The apparatus of claim 11, further comprising:
an antenna; and
a switch coupled to the antenna;
wherein the processor is configured to instruct the switch to sequentially couple a receive signal from the antenna to the first and second energy detection units.

20. The apparatus of claim 11, further comprising a third energy detection unit configured to measure receive energy over a third threshold, wherein the processor is configured to compare the measured receive energy over the third bandwidth to a third energy threshold and to detect the presence of the frequency channel when the measured energies over the first, second and third bandwidths are above the first, second, and third energy thresholds, respectively.

21. An apparatus for detecting the presence of a frequency channel, comprising:
means for measuring receive energy over a first bandwidth;
means for comparing the measured receive energy over the first bandwidth to a first energy threshold;
means for measuring receive energy over a second bandwidth;
means for comparing the measured receive energy over the second bandwidth to a second energy threshold;
means for detecting the presence of the frequency channel when the measured energy over the first bandwidth is above the first energy threshold and the measured receive energy over the second bandwidth is above the second energy threshold;
means for comparing the measured receive energy over the first bandwidth with the measured receive energy over the second bandwidth; and
means for alternately detecting the presence of the frequency channel when the measured receive energies over the first and second bandwidths are approximately the same.

22. The apparatus of claim 21, wherein the first bandwidth is approximately 200 KHz and the second bandwidth is wider than 200 KHz.

23. The apparatus of claim 21, wherein the second bandwidth is approximately 1.25 MHz and the first bandwidth is narrower than 1.25 MHz.

24. The apparatus of claim 21, wherein the first and second bandwidths are approximately centered at the same center frequency.

25. The apparatus of claim 21, wherein:
the means for measuring receive energy over the first bandwidth comprise means for measuring an average receive energy over the first bandwidth;
the means for measuring receive energy over the second bandwidth comprise means for measuring an average receive energy over the second bandwidth;
the means for comparing measured receive energies comprise means for comparing the measured average receive energy over the first bandwidth with the measured average receive energy over the second bandwidth; and
the means for alternately detecting the presence of the frequency channel when the measured receive energies are approximately the same comprise means for detecting the presence of the frequency channel when the measured average receive energies over the first and second bandwidths are approximately the same.

26. The apparatus of claim 25, wherein the second bandwidth is approximately 1.25 MHz and the first bandwidth is narrower than 1.25 MHz.

27. The apparatus of claim 21, wherein:
the means for measuring receive energy over the first bandwidth comprise means for measuring a total receive energy over the first bandwidth;
the means for measuring receive energy over the second bandwidth comprise means for measuring a total receive energy over the second bandwidth;
the means for comparing measured receive energies comprise means for comparing the measured total receive energy over the first bandwidth with the measured total receive energy over the second bandwidth; and
the means for alternately detecting the presence of the frequency channel when the measured receive energies are approximately the same comprise means for detecting the presence of the frequency channel when the measured total receive energy over the second bandwidth is substantially greater than the measured total receive energy over the first bandwidth.

28. The apparatus of claim 27, wherein the second bandwidth is approximately 1.25 MHz and the first bandwidth is narrower than 1.25 MHz.

29. The apparatus of claim 21, further comprising:
means for measuring receive energy over a third bandwidth; and
means for comparing the measured receive energy over the third bandwidth to a third energy threshold;
wherein the means for detecting the presence of the frequency channel detects the frequency channel when the measured energies over the first, second and third bandwidths are above the first, second, and third energy thresholds, respectively.

30. The apparatus of claim 29, wherein the second bandwidth is narrower than the third bandwidth, and the first bandwidth is narrower than the second bandwidth.

31. A non-transitory machine-readable medium comprising a set of one or more instructions, the instructions being executable by one or more processors and the instructions comprising code for:
measuring receive energy over a first bandwidth;
comparing the measured receive energy over the first bandwidth to a first energy threshold;
measuring receive energy over a second bandwidth;
comparing the measured receive energy over the second bandwidth to a second energy threshold;
detecting the presence of the frequency channel when the measured energy over the first bandwidth is above the first energy threshold and the measured receive energy over the second bandwidth is above the second energy threshold;

comparing the measured receive energy over the first bandwidth with the measured receive energy over the second bandwidth; and alternately detecting the presence of the frequency channel when the measured receive energies over the first and second bandwidths are approximately the same.

32. The non-transitory machine-readable medium of claim 31, wherein the first bandwidth is approximately 200 KHz and the second bandwidth is wider than 200 KHz.

33. The non-transitory machine-readable medium of claim 31, wherein the second bandwidth is approximately 1.25 MHz and the first bandwidth is narrower than 1.25 MHz.

34. The non-transitory machine-readable medium of claim 31, wherein the first and second bandwidths are approximately centered at the same center frequency.

35. The non-transitory machine-readable medium of claim 31, wherein:

code for measuring receive energy over the first bandwidth comprises code for measuring an average receive energy over the first bandwidth;

code for measuring receive energy over the second bandwidth comprises code for measuring an average receive energy over the second bandwidth;

code for comparing measured receive energies comprises code for comparing the measured average receive energy over the first bandwidth with the measured average receive energy over the second bandwidth; and code for alternately detecting the presence of the frequency channel when the measured receive energies are approximately the same comprises code for detecting the presence of the frequency channel when the measured average receive energies over the first and second bandwidths are approximately the same.

36. The non-transitory machine-readable medium of claim 35, wherein the second bandwidth is approximately 1.25 MHz and the first bandwidth is narrower than 1.25 MHz.

37. The non-transitory machine-readable medium of claim 31, wherein:

code for measuring receive energy over the first bandwidth comprises code for measuring a total receive energy over the first bandwidth;

code for measuring receive energy over the second bandwidth comprises code for measuring a total receive energy over the second bandwidth;

code for comparing measured receive energies comprises code for comparing the measured total receive energy over the first bandwidth with the measured total receive energy over the second bandwidth; and code for alternately detecting the presence of the frequency channel when the measured receive energies are approximately the same comprises code for detecting the presence of the frequency channel when the total average receive energies over the first and second bandwidths are approximately the same.

38. The non-transitory machine-readable medium of claim 37, wherein the second bandwidth is approximately 1.25 MHz and the first bandwidth is narrower than 1.25 MHz.

39. The non-transitory machine-readable medium of claim 31, further comprising code for:

measuring receive energy over a third bandwidth; and comparing the measured receive energy over the third bandwidth to a third energy threshold;

wherein the code for detecting the presence of the frequency channel comprises code for detecting the presence of the frequency channel when the measured energies over the first, second and third bandwidths are above the first, second, and third energy thresholds, respectively.

40. The non-transitory machine-readable medium method of claim 39, wherein the second bandwidth is narrower than the third bandwidth, and the first bandwidth is narrower than the second bandwidth.

41. An apparatus for detecting the presence of a frequency channel, comprising:

at least one processor configured to receive measured receive energy over a first bandwidth and compare the measured receive energy over the first bandwidth to a first energy threshold, to receive measured energy over a second bandwidth and compare the measured receive energy over the second bandwidth to a second energy threshold, and to detect the presence of the frequency channel when the measured receive energies over the first and second bandwidths are above the first and second energy thresholds, respectively;

wherein the at least one processor is further configured to compare the measured receive energy over the first bandwidth with the measured receive energy over the second bandwidth and to alternately detect the presence of the frequency channel when the measured receive energies over the first and second bandwidths are approximately the same.

42. The apparatus of claim 41, wherein the first bandwidth is approximately 200 KHz and the second bandwidth is wider than 200 KHz.

43. The apparatus of claim 41, wherein the second bandwidth is approximately 1.25 MHz and the first bandwidth is narrower than 1.25 MHz.

44. The apparatus of claim 41, wherein the first and second bandwidths are approximately centered at the same center frequency.

45. The apparatus of claim 41, wherein the at least one processor is configured to receive measured average receive energy over the first bandwidth and measured average receive energy over the second bandwidth, to compare the measured average receive energy over the first bandwidth with the measured average receive energy over the second bandwidth and to detect the presence of the frequency channel when the measured average receive energies over the first and second bandwidths are approximately the same.

46. The apparatus of claim 41, wherein the at least one processor is configured to receive measured total receive energy over the first bandwidth and measured total receive energy over the second bandwidth, to compare the measured total receive energy over the first bandwidth with the total average receive energy over the second bandwidth and to detect the presence of the frequency channel when the measured total receive energy over the second bandwidth is substantially greater then the measured total energy over the first bandwidth.

47. The apparatus of claim 41, wherein the at least one processor is configured to receive measured receive energy over a third bandwidth, to compare the measured receive energy over the third bandwidth to a third energy threshold and to detect the presence of the frequency channel when the measured energies over the first, second and third bandwidths are above the first, second, and third energy thresholds, respectively.

* * * * *